(12) United States Patent
Venkataraman

(10) Patent No.: US 9,928,294 B2
(45) Date of Patent: Mar. 27, 2018

(54) SYSTEM AND METHOD FOR IMPROVING INCIDENT TICKET CLASSIFICATION

(71) Applicant: Wipro Limited, Bangalore (IN)

(72) Inventor: Arthi Venkataraman, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 287 days.

(21) Appl. No.: 14/857,184

(22) Filed: Sep. 17, 2015

(65) Prior Publication Data
US 2017/0032029 A1    Feb. 2, 2017

(30) Foreign Application Priority Data
Jul. 30, 2015    (IN) .......................... 3928/CHE/2015

(51) Int. Cl.
*G06F 17/30* (2006.01)
*G06F 7/00* (2006.01)
*G06Q 30/00* (2012.01)

(52) U.S. Cl.
CPC .. *G06F 17/30707* (2013.01); *G06F 17/30684* (2013.01); *G06Q 30/016* (2013.01)

(58) Field of Classification Search
CPC ........ G06F 17/30707; G06F 17/30684; G06Q 30/016
USPC ....................................................... 707/738
See application file for complete search history.

(56) References Cited

U.S. PATENT DOCUMENTS

| | | | |
|---|---|---|---|
| 7,596,574 B2 | 9/2009 | Sweeney | |
| 8,189,930 B2 | 5/2012 | Renders et al. | |
| 8,351,688 B2 | 1/2013 | Hancock et al. | |
| 8,909,640 B2 | 12/2014 | Robinson et al. | |
| 9,037,518 B2 | 5/2015 | Lakshminarayan et al. | |
| 9,195,814 B1* | 11/2015 | Vazquez | G06F 21/31 |
| 2004/0010592 A1* | 1/2004 | Carver | H04L 47/10 709/226 |
| 2010/0223190 A1* | 9/2010 | Pedersen | G06Q 10/00 705/305 |
| 2012/0051219 A1* | 3/2012 | Hart | H04L 43/026 370/235 |
| 2012/0069131 A1* | 3/2012 | Abelow | G06Q 10/067 348/14.01 |
| 2016/0357859 A1* | 12/2016 | Agarwal | G06F 17/30705 |

FOREIGN PATENT DOCUMENTS

WO    WO 2008/042264    4/2008

* cited by examiner

*Primary Examiner* — Kuen S Lu
(74) *Attorney, Agent, or Firm* — Finnegan, Henderson, Farabow, Garrett & Dunner, LLP (57) ABSTRACT

This disclosure relates generally to automatic classification of incident ticket, and more particularly to a system and method for improving the incident ticket classification. An incident ticket classification system to update an incident ticket classification, the system comprising: a memory; and a processor coupled to the memory storing processor executable instructions which when executed by the processor causes the processor to perform operations comprising: identifying one or more user-defined classes from one or more classes assigned to one or more incident tickets; determining, divergence of the one or more user-defined classes from one or more pre-defined classes associated with the incident ticket classification; and updating, the incident ticket classification based on the divergence.

18 Claims, 4 Drawing Sheets

Title

FIG. 3: Title

FIG. 4: Example Computer System

SYSTEM AND METHOD FOR IMPROVING INCIDENT TICKET CLASSIFICATION

PRIORITY CLAIM

This U.S. patent application claims priority under 35 U.S.C. § 119 to 3928/CHE/2015, filed Jul. 30, 2015. The aforementioned applications are incorporated herein by reference in their entirety.

TECHNICAL FIELD

This disclosure relates generally to automatic classification of incident ticket, and more particularly to a system and method for improving the incident ticket classification.

BACKGROUND

When an incident ticket is raised classification of the incident tickets may be automated. A user may raise his/her issue in natural language as incident ticket. Currently when the user raises the incident ticket he/she may be presented a few choices representing a class in a historical ticket data. The incident ticket may be classified using the historical ticket data. Typically, the choices which may be displayed to the user do not classify the incident ticket correctly. The historical ticket data may be erroneous. Hence accuracy of classification of the incident ticket may be poor.

The choices may be retrieved from the historical ticket data by a predictor component. The predictor component may be usually based on positive models. The positive models may return a class if the incident ticket belongs to the class. But as the historical ticket database may at least 30% of incorrect incident tickets the user may expect the classes to be wrongly returned for a significant number of times. Due to this user may be forced to raise a ticket under a wrong class. Hence a delay may be caused in resolution of issue. Hence there is a need to improve the classification for different classes.

SUMMARY

In one embodiment, a method to update an incident ticket classification, the method comprising: identifying, by an incident ticket classification system, one or more user-defined from one or more classes assigned to one or more incident tickets; determining, by the incident ticket classification system, divergence of the one or more user-defined classed from one or more pre-defined classes associated with the incident ticket classification; and updating, by the incident ticket classification system, the incident ticket classification based on the divergence.

An incident ticket classification system to update an incident ticket classification, the system comprising: a memory; and a processor coupled to the memory storing processor executable instructions which when executed by the processor causes the processor to perform operations comprising: identifying, one or more user-defined from one or more classes assigned to one or more incident tickets; determining divergence of the one or more user-defined classed from one or more pre-defined classes associated with the incident ticket classification; and updating the incident ticket classification based on the divergence.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
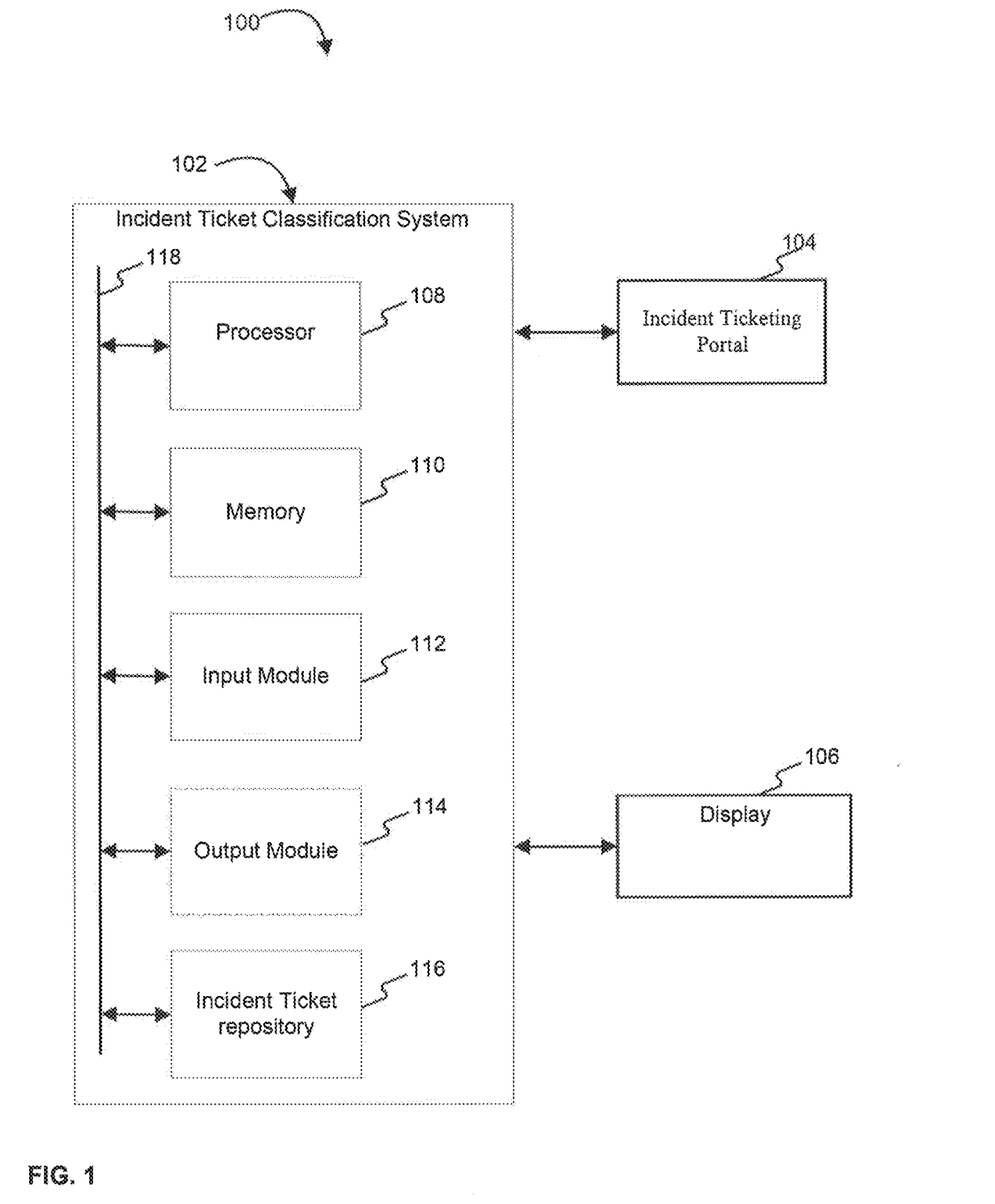
FIG. 1 illustrates an exemplary diagram for an environment with incident ticket classification system to update an incident ticket classification.

FIG. 1 illustrates an exemplary diagram for an environment 100 with incident ticket classification system 102 to update an incident ticket classification. The exemplary environment 100 may include an incident ticket classification system 102, an incident ticketing portal 104 and a display 106. The incident ticket classification system 102 may further include a processor 108, a memory 110, an input module 112, and an output module 114 and an incident ticket repository 116. While not shown, the exemplary environment 100 may include additional components, such as database etc which are well known to those of ordinary skill in the art and thus will not be described here. The incident ticketing portal 104 may be an electronic gateway to a collection of one or more incident tickets raised by a user. One or more incident tickets may be at least one issue or concern or feedback or the like raised by the user in natural language. The display 106 may be peripheral devices used to display result of incident ticket classification system 102 such as a monitor, a projector, a printer.

The incident ticket classification system 102 may update an incident ticket classification. The incident ticket classification system 102 may include at least one input device 112 CPU/processor 108, memory 110, output module 114, and incident ticket repository 116, which may be coupled together by bus 118, although incident ticket classification system 102 may comprise other types and numbers of elements in other configurations.

Processor(s) 108 may execute one or more computer-executable instructions stored in the memory 110 for the methods illustrated and described with reference to the examples herein, although the processor(s) can execute other types and numbers of instructions and perform other types and numbers of operations. The processor(s) 108 may comprise one or more central processing units ("CPUs") or general purpose processors with one or more processing cores, such as AMD) processor(s), although other types of processor(s) could be used (e.g., Intel®).

The memory 110 may comprise one or more tangible storage media, such as RAM, ROM, flash memory, CD-ROM, floppy disk, hard disk drive(s), solid state memory, DVD, or other memory storage types or devices, including combinations thereof, which are known to those of ordinary skill in the art. The memory 110 may store one or more non-transitory computer-readable instructions of this technology as illustrated and described with reference to the examples herein that may be executed by the one or more processor(s) 108.

The input module 112 may receive one or more incident tickets from the incident ticketing portal 104. The output module 106, may link the risk determination engine 102 with peripheral devices such as a display 106.

Figure 2:
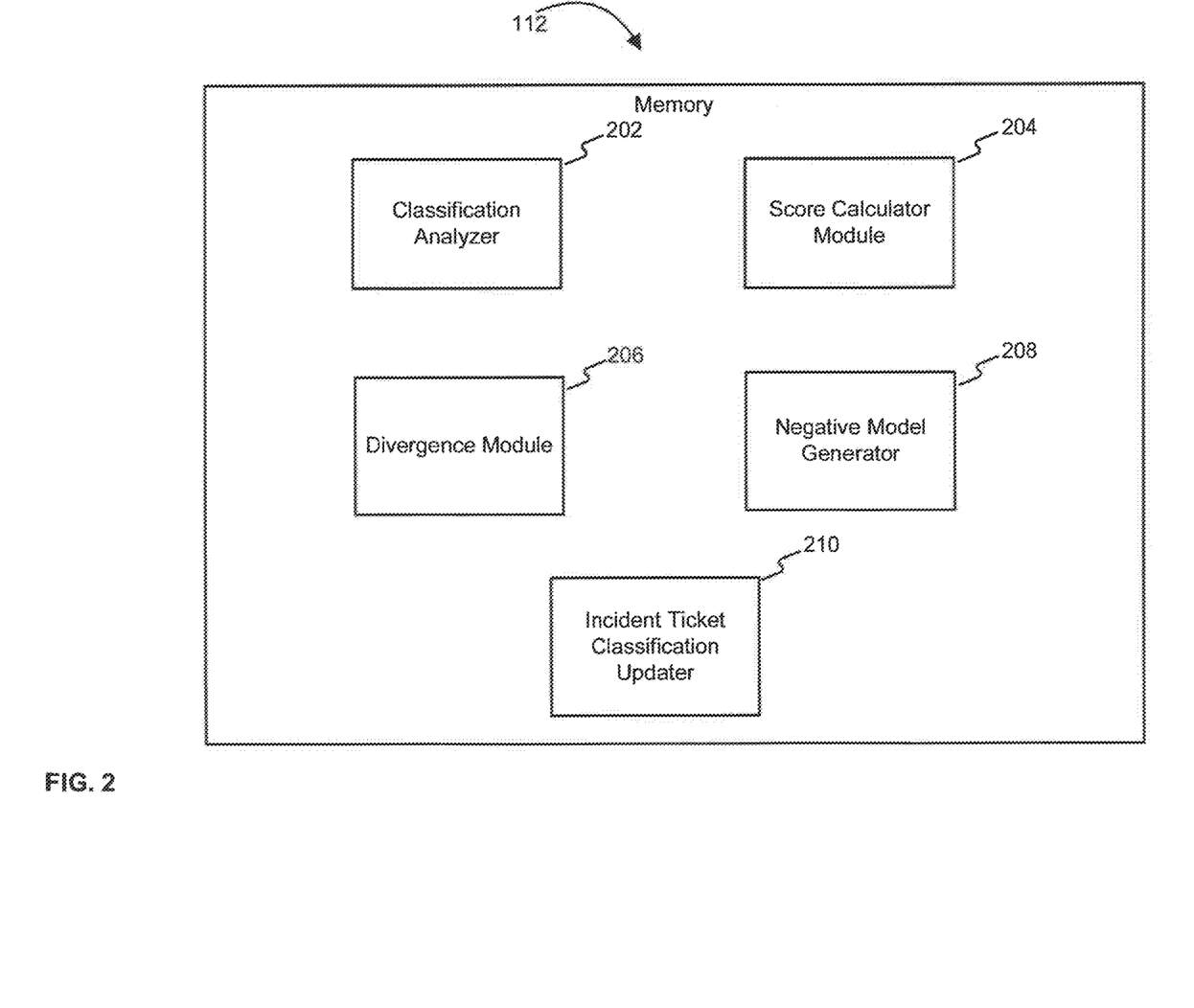
FIG. 2 illustrates memory 110 which may include a classification analyzer, a score calculator, a divergence module, a negative model generator and an incident ticket classification updater.

FIG. 2 illustrates memory 110 which may include a classification analyzer 202, a score calculator 204, a divergence module 206, a negative model generator 208 and an incident ticket classification updater 210. The classification analyzer 202 may identify one or more user-defined from one or more classes assigned to one or more incident tickets. An incident ticket classification may comprise one or more classes. The one or more classes may be one or more user-defined classes and one or more pre-defined classes. The one or more incident tickets may be at least one issue or concern or feedback or any text raised by a user in natural language. While the user is rising the one or more incident tickets by the incident ticketing portal 104, the user may be presented with one or more choices representing one or more pre-defined classes associated with the incident ticket classification. The one or more incident tickets may be assigned to the one or more predefined classes associated with the incident ticket classification, based on the one or more choices selected by the user. The classification analyzer module 202 may identify one or more classes assigned to the one or more incident tickets based on the one or more choices selected by the user. The one or more pre-define classes may be current system assignment CA and historical assignment HA. The one or more user-defined classes may be Manually Assigned User class labelled as MAU or Manually Assigned agent class labelled as MAA. For example, the user may raise one or more incident tickets, but may not select any of the one or more choices. Then the one or more incident tickets, may be assigned to a class MAU. The user may raise one or more incident tickets and may select one of the one or more choices. Then the one or more incident tickets, may be assigned to CA or HA. The one or more incident tickets may be reassigned from a pre-defined class CA to MAA by the user or an agent.

After identifying the one or more user defined classes, the incident ticket classification system 102 may determine divergence of the one or more user-defined classed from one or more pre-defined classes associated with the incident ticket classification. The divergence of the one or more user-defined classes from the one or more pre-defined class may be determined based on a dampening parameter $\beta$, a pre-defined weight assigned to the one or more pre-defined class and number of one or more incident tickets. The pre-defined weight may be assigned to the one or more predefined classes and the one or more classes. For example, in Table A M may have the predefined weight as 1, MAU may have the predefined weight as 0.75, MAA may have the predefined weight as 0.8, CA may have the predefined weight as 0.5 and HA may have the predefined weight as 0.5.

TABLE A

| Source Category | Value |
|---|---|
| M | 1 |
| MAU | 0.75 |
| MAA | 0.8 |
| CA | 0.5 |
| HA | 0.5 |

The score calculator module 204 may calculate an accuracy score for the one or more one or more classes. The accuracy score may be accuracy of assignment of the one or more incident to the one or more classes. If any of the one or more incident tickets are assigned to more than one class of the one or more classes, average score of the each of the one or more classes assigned to the incident ticket would be considered. The accuracy score for the one or more classes may be calculated as Pre-defined weight minus product of the dampening parameter $\beta$ and number of the one or more incident tickets.

Accuracy Score=Pre-defined weight−$\beta$*Number of Incident tickets

For example, Let the dampening parameter $\beta$ be 0.00001. Then the accuracy score for class MAU with 1000 Incident Tickets would be 0.75−(0.00001*1000)=0.74. The accuracy score for class CA with 2000 Incident Tickets would be 0.5−(0.00001*20000)=0.48

The dampening parameter $\beta$ may be used to reduce the pre-defined weight of the one or more classes to save training time and to reduce error oscillations.

The divergence module 206 may compare the accuracy score associated with one or more user-defined classes and the accuracy score associated with one or more pre-defined classes. The comparison of the accuracy score associated with one or more user-defined classes and the accuracy score associated with the one or more pre-defined classes may result in a divergence.

Once the divergence is determined, the incident ticket classification system 102 may update the incident ticket classification based on the divergence. The negative model generator 208 may generate a negative classification on based on the one or more user-defined classes identified by the classification analyzer module 202. The generation of the negative classification may be due to: assignment of one or more incident tickets to the one or more user-defined classes MAU; or reassignment of one or more incident tickets from the one or more pre-defined class to the one or more user-defined classes MAA. The one or more predefined-classes may be updated based on the negative classification and the divergence. The incident ticketing classification updater 210 may remove or reprioritize the one or more predefined classes with accuracy score less than the divergence. The reprioritization may cause one or more incident tickets not to be assigned to the one or more predefined classes. The one or more incident tickets from the one or more deprioritized class may not be used for further iterations. The incident ticketing classification updater 210 may add the one or more user defined classes used in with accuracy score above the divergence to the incident ticket classification.

Figure 3:
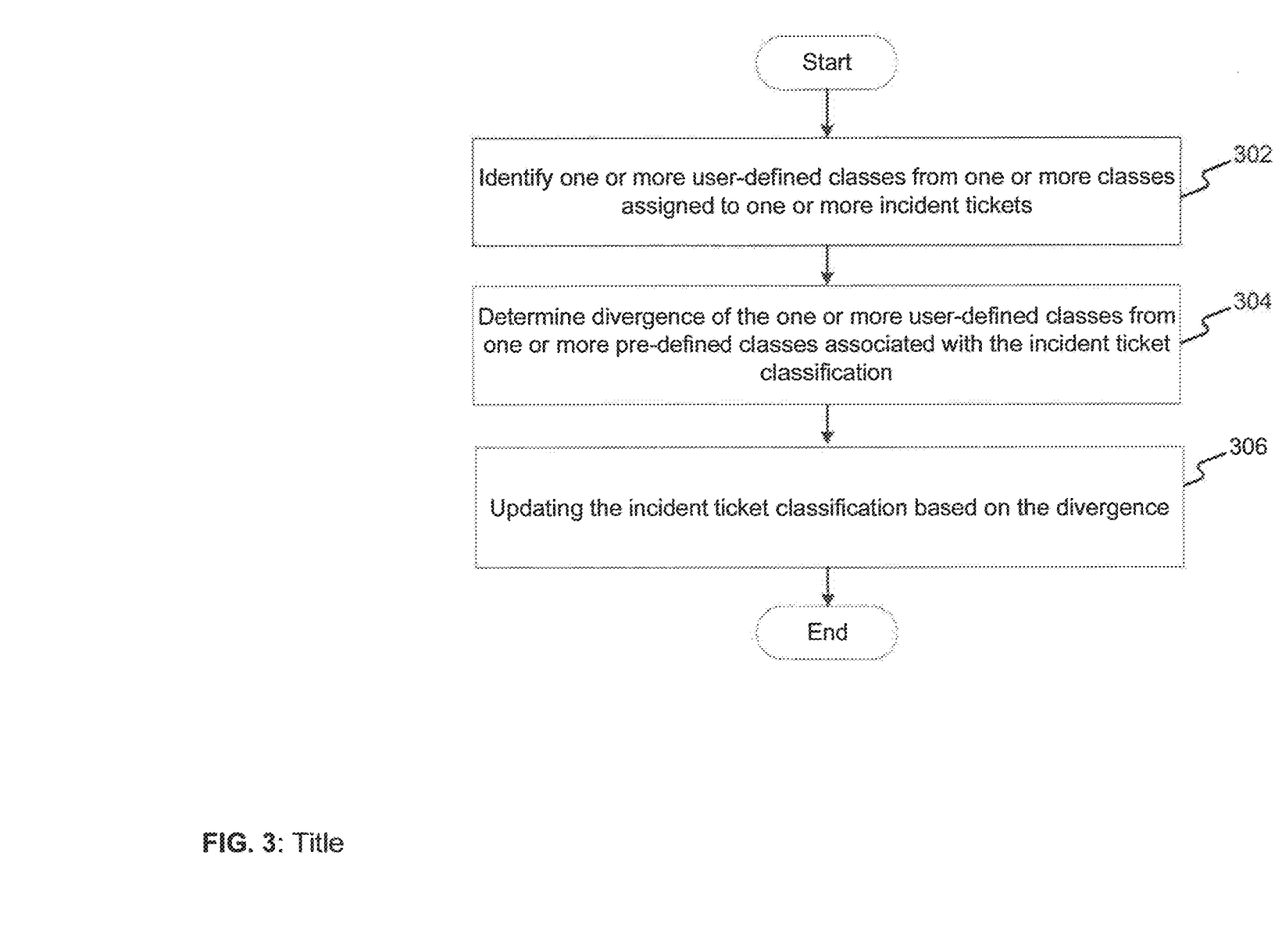
FIG. 3 illustrates an exemplary flow diagram of a method to update an incident ticket classification.

FIG. 3 illustrates an exemplary flow diagram of a method to update an incident ticket classification. The method may involve identifying, by an incident ticket classification system, one or more user-defined classes from one or more classes assigned to one or more incident tickets at step 302. An incident ticket classification may comprise one or more classes. The one or more classes may be one or user-defined classes and one or more pre-defined classes. The one or more incident tickets may be at least one issue or concern or feedback or any text raised by a user in natural language. While the user is rising the one or more incident tickets by the incident ticketing portal 104, the user may be presented with one or more choices representing one or more pre-defined classes associated with the incident ticket classification. The one or more incident tickets may be assigned to the one or more predefined classes associated with the incident ticket classification, based on the one or more choices selected by the user. The classification analyzer module 202 may identify one or more classes assigned to the one or more incident tickets based on the one or more choices selected by the user. The one or more pre-define classes may be current system assigned class CA and historical assigned class HA. The one or more classes may be manually assigned user class MAU or manually assigned agent class MAA. For example, the user may raise one or more incident tickets, but may not select any of the one or more choices. Then the one or more incident tickets, may be assigned to a class MAU. The user may raise one or more incident tickets and may select one of the one or more choices. Then the one or more incident tickets, may be assigned to CA or HA. The one or more incident tickets may be reassigned from a pre-defined class CA to MAA by the user or an agent.

At step 304, the incident ticket classification system 102, may determine a divergence of the one or more user-defined classed from one or more pre-defined classes associated with the incident ticket classification. The divergence of the one or more user-defined classes from the one or more pre-defined class may be determined based on a dampening parameter $\beta$, a pre-defined weight assigned to the one or more pre-defined class and number of one or more incident tickets. The pre-defined weight may be assigned to the one or more predefined classes and the one or more classes. For example, in Table A M may have the predefined weight as 1, MAU may have the predefined weight as 0.75, MAA may have the predefined weight as 0.8, CA may have the pre-defined weight as 0.5 and HA may have the predefined weight as 0.5.

TABLE A

| Source Category | Value |
|---|---|
| M | 1 |
| MAU | 0.75 |
| MAA | 0.8 |
| CA | 0.5 |
| HA | 0.5 |

The score calculator module 204 may calculate an accuracy score for the one or more one or more classes. The accuracy score may be accuracy of assignment of the one or more incident to the one or more classes. If any of the one or more incident tickets are assigned to more than one class of the one or more classes, average score of the each of the one or more classes assigned to the incident ticket would be considered. The accuracy score for the one or more classes may be calculated as Pre-defined weight minus product of the dampening parameter $\beta$ and number of the one or more incident tickets.

Accuracy Score=Pre-defined weight-$\beta$*Number of Incident tickets

For example, Let the dampening parameter $\beta$ be 0.00001. Then the accuracy score for class MAU with 1000 Incident Tickets would be 0.75-(0.00001*1000)=0.74. The accuracy score for class CA with 2000 Incident Tickets would be 0.5-(0.00001*20000)=0.48

The dampening parameter $\beta$ may be used to reduce the pre-defined weight of the one or more classes to save training time and to reduce error oscillations.

The accuracy score associated with one or more user-defined classes may be compared with the accuracy score associated with one or more pre-defined classes by the divergence module 206. The comparison of the accuracy score associated with one or more user-defined classes and the accuracy score associated with the one or more pre-defined classes may result in a divergence.

At step 306, the incident ticket classification system 102 may update the incident ticket classification based on the divergence. A negative classification may be generated, by the negative model generator 208 on based on the one or more user-defined classes identified by the classification analyzer module 202. The generation of the negative classification may be due to: assignment of one or more incident tickets to the one or more user-defined classes MAU; or reassignment of one or more incident tickets from the one or more pre-defined class to the one or more user-defined classes MAA. The one or more predefined-classes may be updated based on the negative classification and the divergence. The one or more predefined classes with accuracy score less than the divergence may be removed or reprioritized from the incident ticketing classification by the incident ticketing classification updater 210. The reprioritization may cause one or more incident tickets not to be assigned to the one or more predefined classes. The one or more incident tickets from the one or more deprioritized class may not be used for further iterations. The one or more user defined classes used in with accuracy score above the divergence may be added to the incident ticket classification by the incident ticketing classification updater 210. Hence the incident ticket classification may be updated.

Computer System

Figure 4:
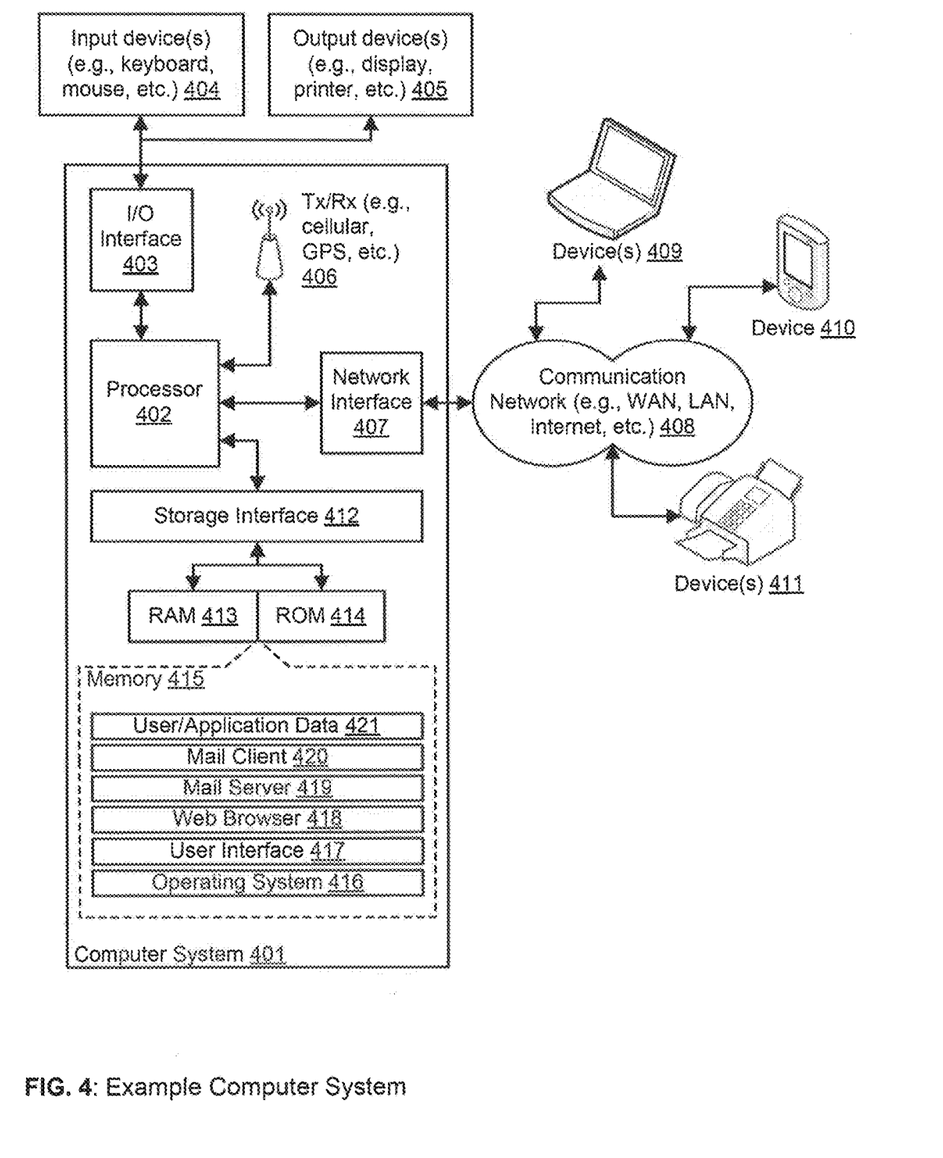
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing, incident ticket classification system 102 and Incident Ticketing Portal 104. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., classification data) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using Object-Store, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a system and method for improving the incident ticket classification. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method to update an incident ticket classification, the method comprising:
   identifying, by an incident ticket classification system, one or more user-defined classes from one or more classes assigned to one or more incident tickets, wherein the user-defined classes are comprised of one of: a pre-defined class, a Manually Assigned User class, or a Manually Assigned Agent class generated by user-input into a computer or a mobile device, and further wherein the user-defined classes are received by the incident ticket via a ticketing portal;
   determining, by the incident ticket classification system, divergence of the one or more user-defined classes from one or more pre-defined classes associated with the incident ticket classification, wherein the divergence one or more user-defined classes from the one or more pre-defined classes is determined based on dampening parameter β, a pre-defined weight assigned to the one or more classes, and a number of incident tickets;
   updating, by the incident ticket classification system, the incident ticket classification based on the divergence; and displaying, by an output module, the result of the incident ticket classification.

2. The method of claim 1, wherein the dampening parameter β is used to reduce the pre-defined weight of the one or more classes to save training time and to reduce error oscillations.

3. The method of claim 1, wherein updating the incident ticket classification based on the divergence further comprises:
   generating a negative classification based on the one or more user-defined class; and
   updating the one or more pre-defined class associated with the incident ticket classification based on the negative classification and the divergence.

4. The method of claim 3, wherein generating a negative classification based on the one or more user-defined classes further comprises:
   assignment of one or more incident tickets to the one or more user-defined classes; or
   reassignment of one or more incident tickets from the one or more pre-defined class to the one or more user-defined classes.

5. The method of claim 1, wherein generating the user-defined classes by input into a computer or mobile device further comprises assigning, via a classification analyzer module, the user-defined class based on the one or more choices selected by the user.

6. The method of claim 1, wherein determining divergence further comprises comparing an accuracy score associated with a user-defined class with the accuracy associated with a pre-defined class.

7. An incident ticket classification system to update an incident ticket classification, the system comprising:
   a memory; and
   a processor coupled to the memory storing processor executable instructions which when executed by the processor causes the processor to perform operations comprising:
   identifying one or more user-defined classes from one or more classes assigned to one or more incident tickets, wherein the user-defined classes are comprised of one of: a pre-defined class, a Manually Assigned User class, or a Manually Assigned Agent class generated by user-input into a computer or a mobile device, and further wherein the user-defined classes are received by the incident ticket via a ticketing portal;
   determining a divergence of the one or more user-defined classed from one or more pre-defined classes associated with the incident ticket classification, wherein the divergence of one or more user-defined classes from the one or more pre-defined classes is determined based on dampening parameter β, a pre-defined weight assigned to the one or more classes, and a number of incident tickets;
   updating the incident ticket classification based on the divergence; and
   displaying, by an output module, the result of the incident ticket classification.

8. The incident ticket classification system of claim 7, wherein the dampening parameter β is used to reduce the pre-defined weight of the one or more classes to save training time and to reduce error oscillations.

9. The incident ticket classification system of claim 7, wherein the operation of updating the incident ticket classification based on the divergence further comprises:
   generating a negative classification based on the one or more user-defined classes; and
   updating the one or more pre-defined classes associated with the incident
   ticket classification based on the negative classification and the divergence.

10. The incident ticket classification of claim 7, wherein the operation of generating a negative classification based on the one or more user-defined classes further comprises:
assignment of one or more incident tickets to the one or more user-defined classes; or
reassignment of one or more incident tickets from the one or more pre-defined class to the one or more user-defined classes.

11. The incident ticket classification system of claim 7, wherein generating the user-defined classes by input into a computer or mobile device further comprises assigning, via a classification analyzer module, the user-defined class based on the one or more choices selected by the user.

12. The incident ticket classification system of claim 7, wherein determining divergence further comprises comparing an accuracy score associated with a user-defined class with the accuracy associated with a pre-defined class.

13. A non-transitory computer readable medium including instructions stored thereon that when processed by at least one processor causes a production surveillance device to perform operations comprising:
identifying one or more user-defined classes from one or more classes assigned to one or more incident tickets, wherein the user-defined classes are comprised of one of: pre-defined class, a Manually Assigned User class, or a Manually Assigned Agent class generated by user-input into a computer or a mobile device, and further wherein the user-defined classes are received by the incident ticket via a ticketing portal;
determining divergence of the one or more user-defined classed from one or more pre-defined classes associated with the incident ticket classification, wherein the divergence of one or more user-defined classes from the one or more pre-defined classes is determined based on dampening parameter β, a pre-defined weight assigned to the one or more classes, and a number of incident tickets;
updating the incident ticket classification based on the divergence; and
displaying, by an output module, the result of the incident ticket classification.

14. The medium of claim 13, wherein the dampening parameter β is used to reduce the pre-defined weight of the one or more classes to save training time and to reduce error oscillations.

15. The medium of claim 13, wherein the operation of updating the incident ticket classification based on the divergence further comprises:
generating a negative classification based on the one or more user-defined class; and
updating the one or more pre-defined class associated with the incident ticket classification based on the negative classification and the divergence.

16. The medium of claim 13, wherein the operation of generating a negative classification based on the one or more user-defined classes further comprises:
assignment of one or more incident tickets to the one or more user-defined classes; or
reassignment of one or more incident tickets from the one or more pre-defined class to the one or more user-defined classes.

17. The non-transitory computer readable medium of claim 13, wherein generating the user-defined classes by input into a computer or mobile device further comprises assigning, via a classification analyzer module, the user-defined class based on the one or more choices selected by the user.

18. The non-transitory computer readable medium of claim 13, wherein determining divergence further comprises comparing an accuracy score associated with a user-defined class with the accuracy associated with a pre-defined class.

* * * * *